United States Patent [19]

Togashi et al.

[11] Patent Number: 5,529,822
[45] Date of Patent: Jun. 25, 1996

[54] PROCESS FOR FORMING A LAMINATE

[75] Inventors: Atsushi Togashi; Takateru Yamada, both of Chiba Prefecture, Japan

[73] Assignee: Dow Corning Toray Silicone Co., Ltd., Tokyo, Japan

[21] Appl. No.: 445,899

[22] Filed: May 22, 1995

Related U.S. Application Data

[62] Division of Ser. No. 295,299, Aug. 24, 1994, Pat. No. 5,468,824.

[30] Foreign Application Priority Data

Sep. 17, 1993 [JP] Japan .................. 5-254696

[51] Int. Cl.⁶ .................................... B32B 9/04
[52] U.S. Cl. ................. 428/352; 106/287.1; 427/208.8; 427/387; 427/391; 427/395; 427/407.1; 427/411; 427/503; 427/505; 427/515; 427/516; 427/551; 427/557; 427/558; 427/559; 427/595; 427/493; 428/345; 428/347; 428/348; 428/354; 428/355
[58] Field of Search .................. 427/515, 493, 427/516, 503, 557, 505, 559, 551, 208.8, 558, 387, 595, 395, 204.4, 411, 391, 407.1; 428/447, 345, 448, 352, 354, 355, 40; 106/287.1

[56] References Cited

U.S. PATENT DOCUMENTS

| | | | |
|---|---|---|---|
| 2,823,218 | 2/1958 | Speier et al. | 260/448.2 |
| 3,159,609 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,296,291 | 1/1967 | Chalk et al. | 260/448.2 |
| 3,419,593 | 12/1968 | Willing | 260/448.2 |
| 3,445,420 | 5/1969 | Keckootsedes et al. | 260/37 |
| 3,516,946 | 6/1970 | Modic | 252/429 |
| 3,814,730 | 6/1974 | Karstedt | 260/46.5 |
| 3,928,629 | 12/1975 | Chandra et al. | 427/387 |
| 4,256,870 | 3/1981 | Eckberg | 528/15 |
| 4,465,818 | 8/1984 | Shirahata et al. | 528/12 |
| 4,472,563 | 8/1984 | Chandra et al. | 528/15 |
| 4,476,166 | 10/1984 | Eckberg | 427/387 |
| 4,533,575 | 8/1985 | Melancon | 427/387 |
| 4,562,096 | 10/1985 | Lo et al. | 427/208.8 |
| 4,774,111 | 9/1988 | Lo | 427/387 |
| 5,036,117 | 7/1991 | Chung et al. | 522/172 |

FOREIGN PATENT DOCUMENTS 187466 9/1990 Japan .

*Primary Examiner*—Bernard Pianalto
*Attorney, Agent, or Firm*—Timothy J. Troy

[57] ABSTRACT

The present invention relates to a process for forming a laminate and the laminate using silicone release coating compositions comprising (A) a mixture of (i) a dimethylsiloxane-methylvinylsiloxane-methylphenylsiloxane copolymer and (ii) a dimethylsiloxane-methylvinylsiloxane copolymer, (B) an organohydrogenpolysiloxane, (C) a platinum catalyst, and (D) an organic solvent. The silicone release coating compositions of the present invention provide small release resistance values both at low and high peeling velocities and do not impair the residual adhesion of tacky substances that have come into contact with the coating.

20 Claims, No Drawings

PROCESS FOR FORMING A LAMINATE

This is a divisional of application Ser. No. 08/295,299 filed on Aug. 24, 1994, U.S. Pat. No. 5,468,824.

BACKGROUND OF THE INVENTION

The present invention relates to a silicone composition that cures to form a release coating. By forming a cured organopolysiloxane coating on the substrate surface, the silicone composition of the present invention provides the surfaces of various types of substrates such as papers, laminated papers, synthetic plastic films, and metal foils with the ability to release tacky substances.

Silicone compositions that cure to form release coatings (i.e. silicone release compositions) are applied to release liners for pressure-sensitive adhesive tapes and pressure-sensitive adhesive sheets in order to form thereon a cured coating that is capable of releasing tacky substances. The cured release coatings used in such applications must exhibit small release resistance values both at low peel velocities (below approximately 0.3 m/minute) and at high peel velocities (above approximately 50 m/minute). Japanese Patent Application Laid Open No. 2-187466 [187,466/90] teaches one example of such a silicone release composition, which consists of a platinum catalyst, an organohydrogenpolysiloxane, and a diorganopolysiloxane mixture composed of a dimethylsiloxane-methylvinylsiloxane copolymer and a dimethylsiloxane-methylvinylsiloxane-diphenylsiloxane copolymer that contains 0.5 to 3.0 mole percent diphenylsiloxane units. However, this composition gives high release resistance values in general and also reduces the residual adhesion of tacky substances that have been brought into contact with its cured release coating. Thus, depending on the application, its performance is not always satisfactory.

SUMMARY OF THE INVENTION

The present invention takes as its object the introduction of a silicone release composition which cures to form a release coating that exhibits small release resistance values at both low and high peeling velocities.

Another object of the present invention is to introduce a silicone release coating composition which does not impair the residual adhesion of tacky substances that have been brought into contact with its cured release coating.

These and other features, objects and advantages of the present invention will be apparent upon consideration of the following detailed description of the invention.

DETAILED DESCRIPTION OF THE INVENTION

The present invention relates to a silicone release coating composition comprising: (A) a mixture of: (i) 90.0 to 99.0 weight percent of a polydiorganosiloxane having the general formula:

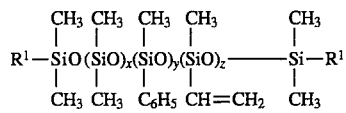

wherein $R^1$ is independently selected from the group consisting of a hydroxyl group, a vinyl group, a methyl group, and a phenyl group, x, y, and z are positive integers such that $0.86 \leq x/(x+y+z) < 0.94$, $0.03 < y/(x+y+z) \leq 0.07$, and $0.03 \leq z/(x+y+z) \leq 0.07$, and (ii) 1.0 to 10.0 weight percent of a polydiorganosiloxane having the general formula:

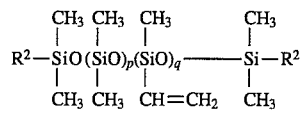

wherein $R^2$ is independently selected from the group consisting of a hydroxyl group, a vinyl group, and a methyl group, p and q are positive integers such that $0.995 \leq p/(p+q) \leq 1.0$ and $0 \leq q/(p+q) \leq 0.005$; (B) an organohydrogenpolysiloxane compound having at least 3 silicon-bonded hydrogen atoms in each compound; (C) a platinum catalyst; and (D) an organic solvent.

The polydiorganosiloxane mixture comprising Component (A) in the compositions of the present invention comprises the polydiorganosiloxane Component (i) and the polydiorganosiloxane Component<ii). The polydiorganosiloxane of Component (i) is a dimethylsiloxane-methylphenylsiloxane-methylvinylsiloxane copolymer having the following general formula:

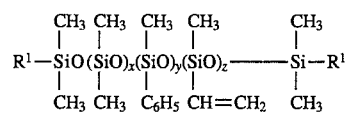

wherein $R^1$ is independently selected from the group consisting of a hydroxyl group, a vinyl group, a methyl group, and a phenyl group, x, y, and z are positive integers such that $0.86 \leq x/(x+y+z) < 0.94$, $0.03 < y/(x+y+z) \leq 0.07$, and $0.03 \leq z/(x+y+z) \leq 0.07$. With respect to the $y/(x+y+z)$ conditions, values of $y/(x+y+z) \leq 0.03$ result in large release resistance values at low peeling velocities, while values in excess of 0.07 result in large release resistance values both an low and high peeling velocities. Values in the range of 0.04 to 0.06 are preferred for $y/(x+y+z)$. With respect to the $z/(x+y+z)$ conditions, values of $z/(x+y+z)$ less than 0.03 result in large release resistance values at high peeling velocities, while values in excess of 0.07 result in large release resistance values at low peeling velocities. Values in the range of 0.04 to 0.06 are preferred for $z/x+y+z)$. The value of $(x+y+z)$ is preferably such that a 30 weight percent toluene solution of Component (i) has a viscosity at 25° C. of at least 500 centistokes and preferably of 3,000 to 20,000 centistokes. The content of Component (i) in Component (A) preferably falls in the range of about 90.0 to 99.0 weight percent.

The polydiorganosiloxane of Component (ii) is a dimethylsiloxane-methylvinylsiloxane copolymer having the following general formula:

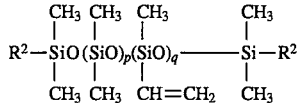

wherein $R^2$ is independently selected from the group consisting of a hydroxyl group, a vinyl group, and a methyl group, p and q are positive integers such that $0.995 \leq p/(p+q) \leq 1.0$ and $0 \leq q/(p+q) \leq 0.005$. With respect to the $q/(p+q)$ conditions, values of $q/(p+q)$ in excess of 0.005 result in large release resistance values at low peeling velocities. Values in the range of 0 to 0.003 are preferred for $q/(p+q)$. The value of $(p+q)$ is preferably such that a 30 weight percent toluene solution of Component (ii) has a viscosity at 25° C. of at least 500 centistokes and preferably of 3,000 to 20,000 centistokes. The content of Component (ii) in Component (A) preferably falls in the range of 1.0 to 10.0 weight percent and it is highly preferred that it range between 3.0 to 7.0 weight percent. When the content of Component (ii) falls below 1.0 weight percent, large release resistance values are exhibited at low peeling velocities. However, if the content of Component (ii) is in excess of 10.0 weight percent this results in a reduction in the residual adhesion of tacky substances that have been applied to the cured release coating.

The organohydrogenpolysiloxane compound of Component (B) in the present invention functions as a crosslinker. This Component must contain at least 3 silicon-bonded hydrogen atoms in each molecule, but the bonding positions of these silicon-bonded hydrogen atoms are not specifically restricted. The silicon-bonded organic groups present in addition to the silicon-bonded hydrogen comprise monovalent hydrocarbon groups that are free of aliphatic unsaturation, for example, alkyl groups such as methyl, ethyl, propyl, butyl, pentyl, and hexyl; aryl groups such as phenyl, tolyl, and xylyl; and aralkyl groups such as benzyl and phenethyl. This Component preferably has a viscosity at 25° C. of 1 to 1,000 centistokes.

Highly preferred linear organohydrogenpolysiloxanes for the compositions of this invention have the formula $YMe_2SiO(Me_2SiO)_p(MeYSiO)_qSiMe_2Y$ wherein Y denotes a hydrogen atom or a methyl radical. An average of at least three Y radicals per compound must be hydrogen atoms. The subscript p can have an average value of zero or more, q must have a value of at least one, and the sum of p plus q has a value of from about 1 to 1000.

Component (B) is added at about 3 to 50 weight parts per 100 weight parts Component (A). The composition of the present invention composition exhibits inadequate cure when less than 3 weight parts Component (B) is added. The release resistance values of the cured release coating tend to vary with elapsed time when Component (B) is added in excess of 50 weight parts.

The platinum catalyst comprising Component (C) in the present invention is a catalyst that accelerates the cure of the invention composition. This Component is exemplified by platinum itself, such as platinum black, platinum supported on silica, and platinum supported on active carbon, and by platinum compounds, such as chloroplatinic acid, alcohol solutions of chloroplatinic acid, chloroplatinic acid-olefin complexes, and chloroplatinic acid-alkenylsiloxane complexes. A preferred platinum-containing catalyst Component in the compositions of this invention is a form of chloroplatinic acid, either as the commonly available hexahydrate form or as the anhydrous form, as taught by Speier, U.S. Pat. No. 2,823,218, incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicone systems. Other catalysts which are thought to be useful in the present invention include those disclosed in U.S. Pat. Nos. 3,159,601; 3,159,662; 3,220,972; 3,296,291; 3,516,946; 3,814,730 and 3,928,629, incorporated herein by reference. Component (C) is added in a catalytic quantity, and is preferably added in a quantity that provides 1 to 1,000 ppm platinum metal per the sum of the quantities of Components (A) and (B).

The organic solvent of Component (D) in the present invention should be inert with respect to Components (A), (B), and (C). Solvents suitable as Component (D) include, for example, hydrocarbons such as toluene, xylene, hexane, and heptane and chlorinated hydrocarbons.

The compositions of the present invention comprises Components (A), (B), (C), and (D) described above. However, it may also contain those additives known for use in silicone release compositions insofar as the object of the invention is not impaired. These additives are exemplified by inorganic fillers such as microparticulate silica, pigments, heat stabilizers, organic resin powders, any of the well-known high release additives of the art, inhibitors such as the acetylenic alcohols of Kookootsedes and Plueddemann, U.S. Pat. No. 3,445,420, such as ethynylcyclohexanol and methylbutynol; conjugated ene-ynes such as those disclosed in U.S. Pat. Nos. 4,465,818 and 4,472,563; the unsaturated carboxylic esters of Eckberg, U.S. Pat. No. 4,256,870, such as diallyl maleate and dimethyl maleate; and the maleates and fumarates of Lo, U.S. Pat. Nos. 4,562,096 and 4,774,111, such as diethyl fumarate, diallyl fumarate, and bis-(methoxyisopropyl) maleate. The half esters and amides of Melancon, U.S. Pat. No. 4,533,575; and the inhibitor mixtures of Eckberg, U.S. Pat. No. 4,476,166. All of the above references related to inhibitors are incorporated herein by reference to teach inhibitors suitable for use in the release coating compositions of the instant invention.

The amount of inhibitor to be used in the compositions of this invention is not critical and can be any amount that will retard the above described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal containing catalyst, the nature and amounts of Components (A), (B), (C) and (D) and the presence or absence of optional ingredients. It is preferred for purposes of this invention that from zero to 5 weight percent of inhibitor be used in the compositions of the instant invention, said weight percent being based on the total weight of the composition.

Bath life extender compounds in a total amount sufficient to further retard the curing reaction at room temperature such as those described in Chung et al., U.S. Pat. No. 5,036,117 are also suitable for use in the release coating compositions of the present invention, also incorporated herein by reference. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender to be used in the compositions of this invention is not critical and is merely that amount that will provide a longer bath life for the composition than the bath life of an identical composition that does not contain the extender. The amount of bath life extender that is to be used in the compositions of this invention can be as high as 10 percent or more by weight, based on the weight of Component (A), however superior results with respect to bath life and cure time can be obtained using a lesser amount. Preferably, the amount of bath life extender to be used in the compositions of this invention falls within the range of 0.1 to 5 percent, and most preferably 1 to 3 percent, by weight, based on the weight of Component (A).

The compositions of the present invention are prepared simply by mixing Components (A), (B), (C), and (D) and any optional components to homogeneity. It is preferred that Components (A), (B), and (D) be mixed first and that the platinum catalyst comprising Component (C) then be mixed in.

The present invention also relates to a process for preparing a laminate of a substrate and an adhesive wherein the adhesive will release from the substrate, the process comprising the steps of (I) coating a curable silicone release composition on the surface of the substrate wherein the composition comprises the release coating composition of the present invention as delineated above, (II) exposing the coating to an energy source selected from the group consisting of (i) heat and (ii) actinic radiation in an amount sufficient to cure the coating, and (III) applying a pressure sensitive adhesive on the coating. The silicone release composition can further comprise an inhibitor and a bath life extender as described above.

By actinic radiation it is meant ultraviolet light; electron beam radiation; and alpha-, beta-, gamma- and x- rays. By heal it is meant infrared radiation, hot-air, microwave radiation, etc. Of course actinic radiation is frequently accompanied by heat and the use of a combination of the two falls within the scope and spirit of the present process. The pressure sensitive adhesive can be non-silicone-based, such as the well-known acrylic or rubber types or silicone-based, such as the peroxide-or platinum-curable polydiorganosiloxane-based adhesives.

Coating and curing of the compositions of this invention on the surface of various substrates such as various types of papers, laminated papers, and synthetic plastic films, yields thereon a coating that is capable of releasing tacky substances. The composition of the present invention can also be used as a release coating for applications other than release liners.

The present invention is explained below in greater detail through working examples. The viscosity values reported in the examples were measured at 25° C. The cured coatings afforded by the silicone release compositions were subjected to tests of the release resistance value, silicone migration, and residual adhesion (%) of tacky substance in accordance with the following methods.

Release Resistance Value

The silicone release composition was coated in the reported quantity on the surface of paper and the cured film was prepared. This film was coated with an acrylic-based pressure-sensitive adhesive (brand name: Oribine BPS5127, from Toyo Ink Mfg. Company, Limited), which was dried by heating for 2 minutes at 70° C. Backing paper was subsequently applied to the preparation, which was thereafter held for 24 hours at 25° C. and 60% humidity under a load of 20 g/cm². The force (gf) required for peeling was then measured by peeling off the backing paper at an angle of 180°. These measurements were carried out at velocities of 0.3 m/minute, 50 m/minute, and 100 m/minute using a Tensilon and a high-speed peeling test instrument. The specimen width was 2.5 cm in all cases.

Silicone Migration

Release paper was fabricated by coating the silicone release composition in the reported quantity on the surface of paper and producing the cured film. A clean polyester film was laid onto the surface of the release paper, and this preparation was held at 25° C. for 30 minutes while loaded with 100 kg/cm² using a press. The polyester film was then peeled off, and a line was drawn with Magic Ink (registered trademark) on the surface of the polyester film that had been in contact with the release paper. The degree of beading by the ink was evaluated: the absence of beading by the ink indicated that silicone migration had not occurred, while the occurrence of ink beading indicated that silicone migration had taken place.

Residual Adhesion

The silicone release composition was coated in the reported quantity on the surface of paper and the cured film was prepared. Pressure-sensitive adhesive tape (brand name: Nitto Polyester Pressure-Sensitive Tape 31B, from Nitto Denko Kabushiki Kaisha) was applied to the surface of the film, and the assembly was then aged for 20 hours at 70° C. under a load of 20 g/cm². The pressure-sensitive adhesive tape was subsequently removed and applied to a stainless steel sheet. After holding for 30 minutes at 25° C. under a load of 20 g/cm², the pressure-sensitive adhesive tape was peeled at 180° and 0.3 m/minute and the force (gf) required for peeling was measured. The blank test consisted of application of the same type of pressure-sensitive adhesive tape to a Teflon sheet under the same conditions as above followed by measurement of the force (gf) required to peel the tape, again using the same conditions as above. The residual adhesion (%) was calculated using the obtained measurement values and the following equation:

$$\text{residual adhesion (\%)} = \frac{\text{force } (gf) \text{ required to peel the pressure-sensitive adhesion tape that had been applied to the cured film afforded by the silicone composition}}{\text{force } (gf) \text{ required to peel the pressure-sensitive adhesion tape that had been applied to the Teflon sheet}} \times 100$$

EXAMPLE 1

The following were dissolved in 1,420 weight parts toluene: 94 weight parts of a trimethylsiloxy-endblocked dimethylsiloxane-methylvinylsiloxane-methylphenylsiloxane copolymer (having a viscosity in the 30 weight percent toluene solution of this copolymer of about 3,000 centistokes), comprising 90 mole percent dimethylsiloxane units, 5 mole percent methylvinylsiloxane units, and 5 mole percent methylphenylsiloxane units, and 6 weight parts of a dimethylvinylsiloxy-endblocked dimethylpolysiloxane (having a viscosity in the 30 weight percent toluene solution of this dimethylpolysiloxane of about 15,000 centistokes). The following were then homogeneously dissolved into this solution: 7 weight parts of trimethylsiloxy-endblocked methylhydrogenpolysiloxane (having a viscosity of about 20 centistokes) and 2 weight parts 3-methyl-1-butyn-3-ol. A silicone release composition was finally prepared by mixing into the resulting solution a sufficient amount of a 3 weight percent isopropanolic chloroplatinic acid solution to yield about 200 ppm platinum metal.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as delineated hereinabove, and these results are reported in Table 1.

EXAMPLE 2

The following were dissolved in 1,420 weight parts toluene: 96 weight parts of a dimethylvinylsiloxy-endblocked dimethylsiloxane-methylvinylsiloxane-methylphenylsiloxane copolymer (having a viscosity in the 30 weight percent toluene solution of this copolymer of about 5,000 centistokes), comprising 92.5 mole percent dimethylsiloxane units, 4 mole percent methylvinylsiloxane units, and 3.5 mole percent methylphenylsiloxane units, and 4 weight parts trimethylsiloxy-endblocked dimethylsiloxane-methylvinylsiloxane copolymer (having a viscosity in the 30 weight percent toluene solution of this copolymer of about 5,000 centistokes) comprising 99.7 mole percent dimethylsiloxane units and 0.3 mole percent methylvinylsiloxane units. The following were then homogeneously dissolved into this solution: 1 weight part 3-methyl-1-butyn-3-ol and 10 weight parts trimethylsiloxy-endblocked dimethylsiloxane-methylhydrogensiloxane copolymer (having a viscosity of about 70 centistokes) comprising 30 mole percent dimethylsiloxane units and 70 mole percent methylhydrogensiloxane units. A silicone release composition was finally prepared by mixing into the resulting solution a sufficient amount of a 3 weight percent isopropanolic chloroplatinic acid solution to yield 200 ppm platinum metal.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as described above, and these results are reported in Table 1.

COMPARATIVE EXAMPLE 1

A silicone release composition was prepared as in Example 1, but in this case using a trimethylsiloxy-endblocked dimethylsiloxane-methylvinylsiloxane-methylphenylsiloxane copolymer (having a viscosity in the 30 weight percent toluene solution of this copolymer of about 3,000 centistokes) comprising 94 mole percent dimethylsiloxane units, 5 mole percent methylvinylsiloxane units, and 1 mole percent methylphenylsiloxane units in place of the trimethylsiloxy-endblocked dimethylsiloxane (90 mole percent)-methylvinylsiloxane (5 mole percent)-methylphenylsiloxane (5 mole percent) copolymer that was used in Example 1.

The resulting silicone release composition was coated on the surface of polyethylene-laminated high-grade paper so as to yield a value of approximately 0.6 g/m² for the sum of Components (A), (B), and (C). A cured film was produced by heating at 130° C. for 20 seconds. This cured film was subjected to the tests for its release resistance value, silicone migration, and residual adhesion as delineated above, and these results are reported in Table 1.

COMPARATIVE EXAMPLE 2

A silicone release composition was prepared as in Example 1, but in this case using a trimethylsiloxy-endblocked dimethylsiloxane-methylvinylsiloxane-methylphenylsiloxane copolymer (having a viscosity in the 30 weight percent toluene solution of this copolymer of about 5,000 centistokes) comprising 84 mole percent dimethylsiloxane units, 6 mole percent methylvinylsiloxane units, and 10 mole percent methylphenylsiloxane units in place of the trimethylsiloxy-endblocked dimethylsiloxane (90 mole percent) -methylvinylsiloxane (5 mole percent)-methylphenylsiloxane (5 mole percent) copolymer that was used in Example 1.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as delineated above, and these results are reported in Table 1.

COMPARATIVE EXAMPLE 3

A silicone release composition was prepared as in Example 1, but in this case using a dimethylvinylsiloxy-endblocked dimethylsiloxane-methylvinylsiloxane copolymer (having a viscosity in the 30 weight percent toluene solution of the copolymer of about 15,000 centistokes) comprising 98 mole percent dimethylsiloxane units and 2 mole percent methylvinylsiloxane units in place of the dimethylvinylsiloxy-endblocked dimethylpolysiloxane that was used in Example 1.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as delineated above, and these results are reported in Table 1.

COMPARATIVE EXAMPLE 4

A silicone release composition was prepared as in Example 1, but in this case using a dimethylhydroxysiloxy-endblocked dimethylpolysiloxane (having a viscosity of about 10,000 centistokes) in place of the dimethylvinylsiloxy-endblocked dimethylpolysiloxane that was used in Example 1.

The resulting silicone release composition was coated on the surface of polyethylene-laminated high-grade paper so as to yield a value of approximately 0.6 g/m² for the sum of Components (A), (B), and (C). A cured film was produced by heating at 130° C. for 20 seconds. This cured film was subjected to tests for its release resistance value, silicone migration, and residual adhesion as described above, and these results are reported in Table 1.

COMPARATIVE EXAMPLE 5

A silicone release composition was prepared as in Example 1, but in this case altering the amounts in Example 1 to 99.5 weight parts for the trimethylsiloxy-endblocked dimethylsiloxane (90 mole percent)-methylvinylsiloxane (5 mole percent)- methylphenylsiloxane (5 mole percent) copolymer and to 0.5 weight parts for the dimethylvinylsiloxy-endblocked dimethylpolysiloxane.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as described above, and these results are reported in Table 1.

COMPARATIVE EXAMPLE 6

A silicone release composition was prepared as in Example 1, but in this case altering the amounts in Example 1 to 80 weight parts for the trimethylsiloxy-endblocked dimethylsiloxane (90 mole percent)-methylvinylsiloxane (5 mole percent)-methylphenylsiloxane (5 mole percent) copolymer and to 20 weight parts for the dimethylvinylsiloxy-endblocked dimethylpolysiloxane.

The resulting silicone release composition was coated on the surface of polyethylene-laminated high-grade paper so as to yield a value of approximately 0.6 g/m² for the sum of Components (A), (B), and (C). This cured film was subjected to tests for its release resistance value, silicone migration, and residual adhesion as described above, and these results are reported in Table 1.

COMPARATIVE EXAMPLE 7

A silicone release composition was prepared as in Example 1, but in this case using a trimethylsiloxy-endblocked dimethylsiloxane-methylvinylsiloxane-diphenylsiloxane copolymer (90 mole percent dimethylsiloxane units, 5 mole percent methylvinylsiloxane units, 5 mole percent diphenylsiloxane units) in place of the trimethylsiloxy-endblocked dimethylsiloxane (90 mole percent)-methylvinylsiloxane (5 mole percent)-methylphenylsiloxane (5 mole percent) copolymer that was used in Example 1.

The resulting silicone release composition was coated on the surface of polyethylene-laminated high-grade paper so as to yield a value of approximately 0.6 g/m² for the sum of Components (A), (B), and (C). A cured film was produced by heating the coated paper at 130° C. for 20 seconds. This cured film was subjected to tests for its release resistance value, silicone migration, and residual adhesion as described above, and these results are reported in Table 1.

TABLE 1

| | release resistance values (gf/2.5 cm) | | | residual adhesion (%) | silicone migration |
|---|---|---|---|---|---|
| | 0.03 m/min | 50 m/min | 100 m/min | | |
| Example 1 | 8 | 45 | 65 | 98 | no |
| Example 2 | 8 | 35 | 60 | 99 | no |
| Comparative Example 1 | 26 | 60 | 85 | 98 | no |
| Comparative Example 2 | 34 | 70 | 100 | 94 | yes |
| Comparative Example 3 | 28 | 65 | 90 | 98 | no |
| Comparative Example 4 | 20 | 50 | 70 | 90 | yes |
| Comparative Example 5 | 32 | 50 | 75 | 99 | no |
| Comparative Example 6 | 7 | 80 | 105 | 92 | yes |
| Comparative Example 7 | 41 | 93 | 135 | 93 | yes |

That which is claimed is:

1. A process for preparing a laminate of a substrate and an adhesive wherein the adhesive will release from the substrate, the process comprising the steps of:
   (I) coating a curable silicone release composition on the surface of a substrate wherein the composition comprises
   (A) a mixture of:
      (i) 90.0 to 99.0 weight percent of a polydiorganosiloxane having the general formula:

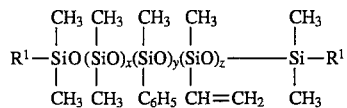

wherein R¹ is independently selected from the group consisting of a hydroxyl group, a vinyl group, a methyl group, and a phenyl group, x, y, and z are positive integers such that 0.86≦x/(x+y+z)<0.94, 0.04<y/(x+y+z)≦0.07, and 0.03≦z/(x+y+z)<0.07 and
      (ii) 1.0 to 10.0 weight percent of a polydiorganosiloxane having the general formula:

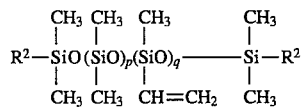

wherein R² is independently selected from the group consisting of a hydroxyl group, a vinyl group, and a methyl group, p and q are positive integers such that 0.995≦p/(p+q)≦1.0 and 0≦q/(p+q)≦0.005;
   (B) an organohydrogenpolysiloxane compound having at least 3 silicon-bonded hydrogen atoms in each compound;
   (C) a platinum catalyst; and
   (D) an organic solvent;
   (II) exposing the coating to an energy source selected from the group consisting of (i) heat and (ii) actinic radiation in an amount sufficient to cure the coating; and
   (III) applying a pressure sensitive adhesive on the coating.

2. A process according to claim 1, wherein the silicone release composition further comprises an inhibitor.

3. A process according to claim 2, wherein the silicone release composition further comprises a bath life extender.

4. A process according to claim 3, wherein the bath life extender is selected from the group consisting of compounds having one or more primary or secondary alcohol groups, carboxylic acids, compounds which yield carboxylic acids when exposed to water at room temperature, cyclic ethers, and water.

5. A product produced in accordance with the process of claim 3.

6. A process according to claim 2, wherein the inhibitor is selected from the group consisting of acetylenic alcohols, conjugated ene-ynes, maleates, and fumarates.

7. A process according to claim 6, wherein the acetylenic alcohol is selected from ethynylcyclohexanol or methylbutynol.

8. A product produced in accordance with the process of claim 7.

9. A process according to claim 6, wherein the maleate is selected from the group consisting of diallyl maleate, dimethyl maleate, and bis-(methoxyisopropyl) maleate.

10. A process according to claim 6, wherein the fumarate is selected from diethyl fumarate or diallyl fumarate.

11. A product produced in accordance with the process of claim 7.

12. A process according to claim 1, wherein the substrate is paper.

13. A product produced in accordance with the process of claim 12.

14. A product produced in accordance with the process of claim 1.

15. A process according to claim 1, wherein y is a positive integer such that the value of y/(x+y+z) is from 0.04 to 0.06.

16. A product produced in accordance with the process of claim 15.

17. A process according to claim 1, wherein z is a positive integer such that the value of z/(x+y+z) is from 0.04 to 0.06.

18. A process according to claim 1, wherein (B) is a linear organohydrogenpolysiloxane having the formula $$YMe_2SiO(Me_2SiO)_p(MeYSiO)_qSiMe_2Y$$

wherein Y is selected from a hydrogen atom or a methyl radical, p has a value of zero or greater than zero, q has a value of at least one, the sum of p plus q has a value from about 1 to 1000, with the proviso that an average of at least three Y radicals per compound are hydrogen atoms.

19. A process according to claim 1, wherein (C) is selected from the group consisting of platinum black, platinum supported on silica, platinum supported on active carbon, chloroplatinic acid, alcohol solutions of chloroplatinic acid, chloroplatinic acid-olefin complexes, and chloroplatinic acid-alkenylsiloxane complexes.

20. A process according to claim 1, wherein (D) is selected from the group consisting of toluene, xylene, hexane, heptane, and chlorinated hydrocarbons.

* * * * *